(12) United States Patent
Wipperfurth (10) Patent No.: US 6,463,947 B1
(45) Date of Patent: Oct. 15, 2002

(54) DIRECTIONALLY ILLUMINATED WALKING AID

(76) Inventor: Kurt A. Wipperfurth, 105 Riverside Dr., Ormond Beach, FL (US) 32176

( * ) Notice: Subject to any disclaimer, the term of this patent is extended or adjusted under 35 U.S.C. 154(b) by 0 days.

(21) Appl. No.: 09/678,287

(22) Filed: Oct. 2, 2000

(51) Int. Cl.[7] .................................................. A45B 3/02
(52) U.S. Cl. ............................. 135/65; 135/67; 135/69; 135/910; 362/102; 403/320
(58) Field of Search ................................ 135/65, 66, 67, 135/68, 910, 911, 69; 362/102, 298, 297; D3/7; 403/300, 308, 320

(56) References Cited

U.S. PATENT DOCUMENTS

| | | | |
|---|---|---|---|
| 2,435,650 A | * | 2/1948 | Greene ........................ 135/910 |
| 2,597,172 A | | 5/1952 | Parker |
| 2,642,519 A | | 6/1953 | Caustin et al. |
| D230,531 S | | 2/1974 | Thomas |
| 4,099,535 A | | 7/1978 | Hubachek |
| 4,208,701 A | * | 6/1980 | Schock ................... 362/102 X |
| D272,677 S | | 2/1984 | Bove et al. |
| D278,387 S | | 4/1985 | Bixler |
| D283,370 S | | 4/1986 | Hill |
| 4,625,742 A | | 12/1986 | Phillips |
| D294,868 S | | 3/1988 | Sim |
| 4,837,666 A | | 6/1989 | Conkle |
| 4,869,280 A | | 9/1989 | Ewing |
| D324,134 S | | 2/1992 | Williams |
| 5,197,501 A | | 3/1993 | Ragatz |
| 5,226,718 A | | 7/1993 | Lin |
| 5,331,990 A | | 7/1994 | Hall et al. |
| 5,339,853 A | * | 8/1994 | Sokolis et al. ................. 135/67 |
| 5,351,704 A | | 10/1994 | Hunnicutt, Jr. et al. |
| 5,402,811 A | | 4/1995 | Weng |
| 5,642,931 A | * | 7/1997 | Gappelberg .................. 362/102 |
| D408,126 S | | 4/1999 | Hunnicutt, Jr. et al. |

FOREIGN PATENT DOCUMENTS

| | | | | |
|---|---|---|---|---|
| CH | 630515 A5 | 6/1982 | | |
| DE | 2655215 | 6/1978 | | |
| FR | 1027932 | 5/1953 | | |
| FR | 1524955 | 5/1968 | | |
| FR | 2549353 | * | 1/1995 | ................. 135/910 |
| GB | 536610 | 5/1941 | | |
| GB | 1270457 | 4/1972 | | |
| GB | 2110081 | 6/1983 | | |

* cited by examiner

*Primary Examiner*—Lanna Mai
*Assistant Examiner*—Winnie Yip
(74) *Attorney, Agent, or Firm*—Edward M. Livingston, Esq.

(57) ABSTRACT

A directionally illuminated walking aid has a walking-aid shaft (1) that is predeterminedly transparent with, an internal light (4, 20) directed vertically from a top reflector (2) towards a bottom cap (3) from which vertical reflectors (5) may be extended upwards for reflecting light (6) forward and/or radially from intermediate the top reflector and a bottom reflector (8). Opposite and/or intermediate the vertical reflectors are light rings (15, 16, 17) in non-reflector portions of the walking-aid shaft to allow emission of light reflected from the vertical reflectors. The walking-aid shaft is a leg of a cane (9), crutch (10), walker (11) or other walking aid. An electrical source (13) in the walking aid is switched selectively from proximate a handle (39) of the walking aid. The internal light can be steady, pulsatile, incandescent, fluorescent or other type of electrical light. The current source can be storable, chargeable and/or plug-in. The optional vertical reflectors can be permanent or attachable and adjustable. The walking-aid shaft can be detachable for use as a walkway lighter (12) independently or on selectively different walking aids.

23 Claims, 6 Drawing Sheets

DIRECTIONALLY ILLUMINATED WALKING AID

BACKGROUND OF THE INVENTION

This invention relates to light-emitting walking aids.

Many illuminated walking aids are known. None, however, have optionally directional illumination in a manner taught by this invention.

Examples of most-closely related known but yet different illuminated walking aids are described in the following patent documents. U.S. Pat. No. 5,351,704, issued to Hunnicutt, Jr., et al. on Oct. 4, 1994, described a walking cane having a transparent shaft illuminated downwardly by a bulb that reflected optionally against bottom tip reflectors in addition to dispensing light radially through the transparent shaft. Similarly, U.S. Pat. No. 2,642,519, issued to Caustin, et al. on Jun. 27, 1949 described a luminous cane with transparent walls through which light was emitted, but with less effective tip reflectors. U.S. Pat. No. 4,625,742, issued to Phillips on Dec. 2, 1986, described a lighted walking cane with light-emitting orifices of various shapes that emitted light from a central source but did not have side reflectors taught by this invention nor tip reflectors taught by the Hunnicutt patent.

Illumination for walking aids remains a serious problem for much of the handicapped and increasingly aged portion of society. Enabling differences from prior art need not be great to make a great difference to disabled people. Much time and effort has been spent over long periods of time by users of walking aids to improve their mobility. Refinement changes and modification of prior art can be crucial.

SUMMARY OF THE INVENTION

Objects of patentable novelty and utility taught by this invention are to provide a directionally illuminated walking aid which:

- allows selection of optionally forward, rearward and/or sideward directional lighting from a shaft of a walking aid;
- allows selectively proportional forward, rearward and/or sideward lighting from the shaft of the walking aid; and
- lights areas and objects in addition to walkways.

This invention accomplishes these and other objectives with a directionally illuminated walking aid having; a shaft that is predeterminedly transparent with an internal light directed vertically from a top reflector towards a bottom cap from which optionally selective vertical reflectors are extended upwards for reflecting light angularly forward, rearward, sideward and/or radially from intermediate the top reflector and a bottom reflector. Opposite and/or intermediate the vertical reflectors are vacant portions of the shaft to allow emission of light reflected from the vertical reflectors. The shaft is a leg of a cane, crutch, walker or other walking aid. A current source in the walking aid is switched selectively from proximate a handle of the walking aid. The internal light can be steady, pulsatile, incandescent, fluorescent or other type of electrical light. The current source can be storable, chargeable and/or plug-in. The vertical reflectors can be permanent or attachable and adjustable. The shaft can be detachable for use as a light source independently or on selectively different walking aids.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.
1. Walking-aid shaft
2. Top reflector
3. Bottom cap
4. Incandescent light
5. Vertical reflector
6. Light
7. Reflective channel
8. Bottom reflector
9. Cane
10. Crutch
11. Walker
12. Walkway lighter
13. Power source
14. Vertical back surface
15. Top light ring
16. Bottom light ring
17. Intervening light ring
18. Extension reflector
19. Walker feet
20. Flourescent light
21. Walking-aid member
22. Internal attachment threads
23. External attachment threads
24. Rigidity exterior
25. Rigidity interior
26. Truncate-conical tip
27. Rigidity ring
28. Adjustment rings
29. Ring grooves
30. Clamp members
31. Pressure bolt
32. Strap nut
33. Clamp strap
34. Electrical mines
35. Mechanical linkage
36. Mechanical-linkage switch
37. Electrical-linkage switch
38. On/Off knob, key or push button
39. Handle Reference is made first to FIGS. 1–7. A directionally illuminated walking aid has a walking-aid shaft 1 that is predeterminedly transparent intermediate a top reflector 2 and a bottom cap 3. An internal light, which can include an incandescent light 4 is positioned proximate the top reflector 2 to emit light through the transparent portion of the walking-aid shaft 1 to light the path of a user. The walking-aid may have at least one vertical reflector 5 positioned selectively intermediate the bottom cap 3 and the top reflector 2 inside of the walking-aid shaft 1 for reflecting light 6, indicated by dashed lines, outwardly through the walking-aid shaft 1.

The vertical reflector 5 includes a reflective channel 7 that is oriented vertically inside of walls of the walking-aid shaft 1 for reflecting the light 6 an vertically through the walls of the walking-aid shaft 1 oppositely from the reflective channel 7. A bottom reflector 8 below the top reflector 2 reflects light 6 back upwardly and towards the reflective channel 7 for being emitted directionally outward. The walking-aid shaft 1 is a portion of a leg of a walking aid that includes a cane 9 shown in FIGS. 1, 14, 15, and 19, a crutch 10 shown in FIG. 22, a walker 11 shown in FIG. 24 or a walkway lighter 12 shown in FIG. 21.

An electrical power source 13 such as a storage battery in the walking aid is in switchable communication with the internal light such as the incandescent light 4.

Figure 1:
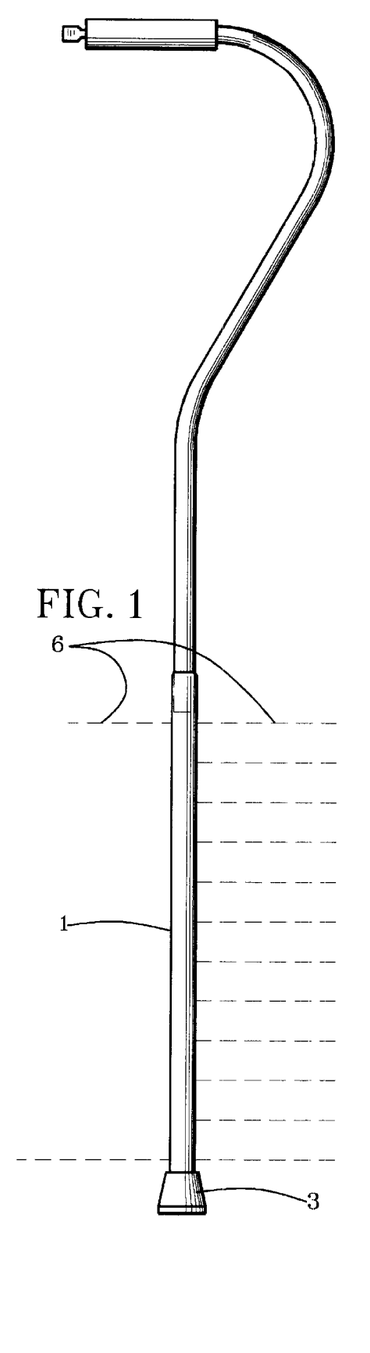
FIG. 1 is an elevation view of a walking-aid shaft on a cane.
Figures 2, 3:
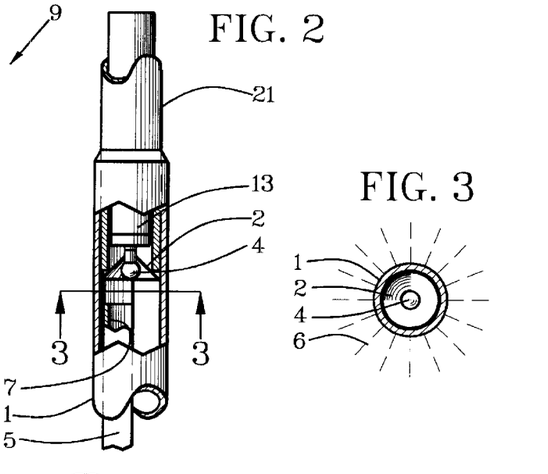
FIG. 2 is a partially cutaway side view of a top portion of a walking-aid shaft having a top light ring intermediate a top reflector and a vertical reflector for light emission in all directions.
FIG. 3 is a section view through section line 2 of FIG. 2 with light rays in all directions.
Figures 4, 5:
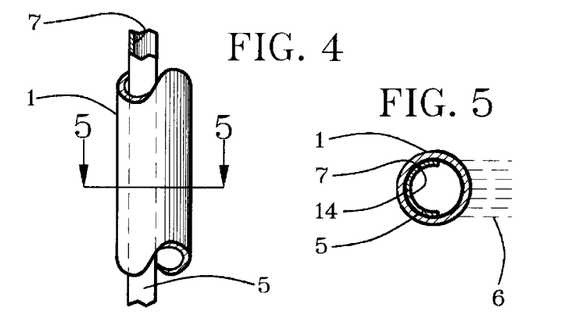
FIG. 4 is a partially cutaway side view of a central portion of a walking-aid shaft in which a vertical reflector is positioned.
FIG. 5 is a section view through section line 4 of FIG. 4 with light rays only in a forward direction that is opposite the vertical reflector.
Figures 6, 7:
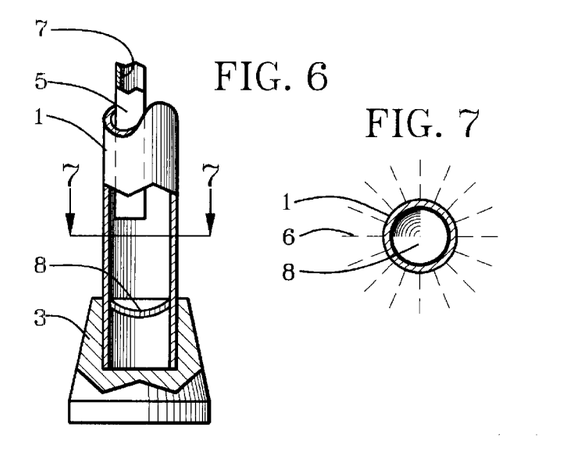
FIG. 6 is a partially cutaway side view of a bottom portion of a walking-aid shaft having a bottom light ring intermediate a bottom reflector and a vertical reflector for light emission in all directions.
FIG. 7 is a section view through section line 6 of FIG. 6 with light rays in all directions.
Figures 8, 9, 10, 11, 12, 13, 14:
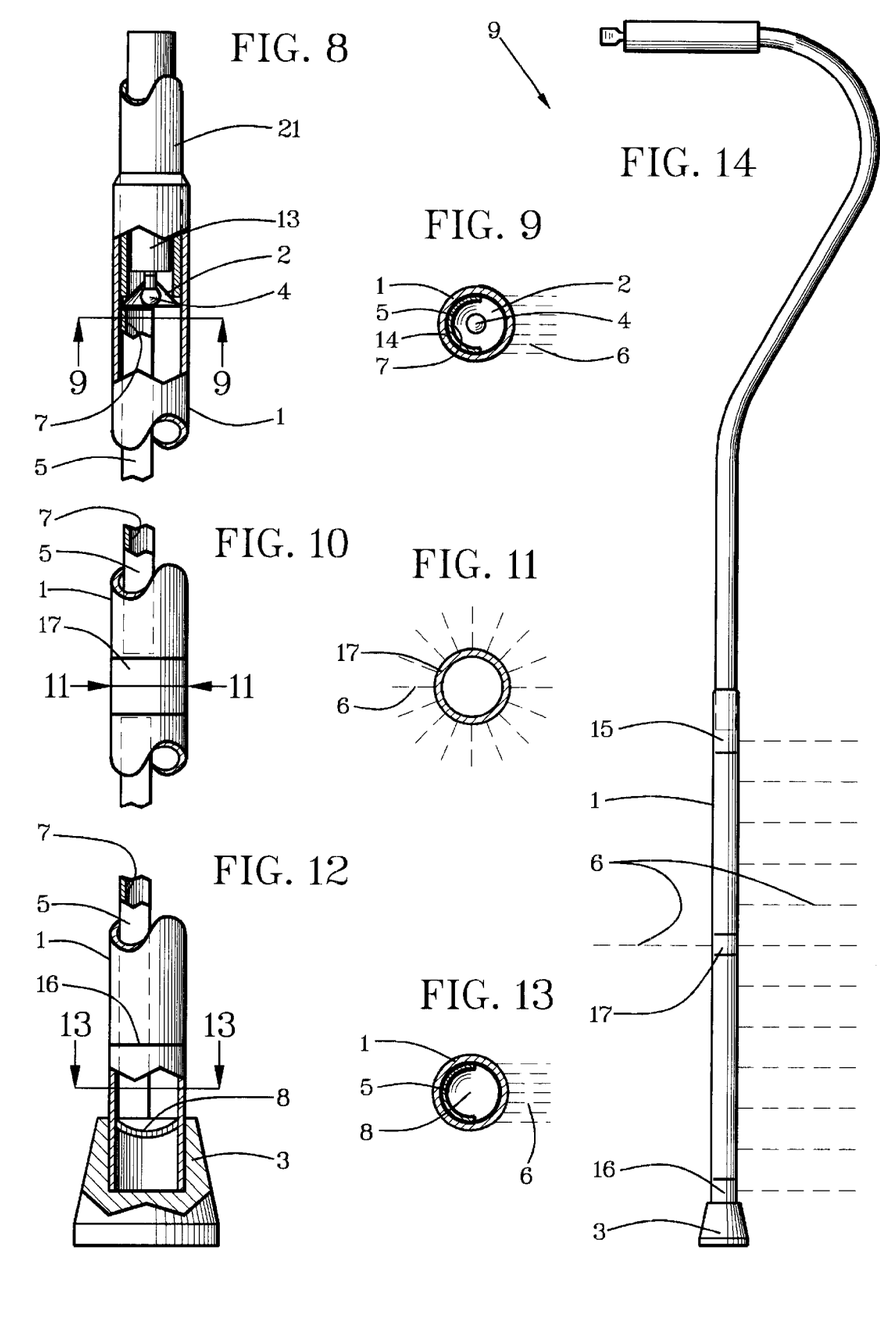
FIG. 8 is a partially cutaway side view of a top portion of a walking-aid shaft having a vertical reflector ending at the top reflector for light emission in a forward direction only.
FIG. 9 is a section view through section line 8 of FIG. 8 with light rays directed forwardly.
FIG. 10 is a partially cutaway side view of a central portion of a walking-aid shaft having an interval of separation between a plurality of vertical reflectors.
FIG. 11 is a section view through section line 10 of FIG. 10 with light rays in all directions radially through a light ring.
FIG. 12 is a partially cutaway side view of a bottom portion of a walking-aid shaft having an optionally colored bottom light ring proximate a bottom reflector and a vertical reflector for light emission in only a forward direction.
FIG. 13 is a section view through section line 12 of FIG. 12 with light rays in only a forward direction.
FIG. 14 is an elevation view of a walking-aid shaft having top, central and bottom light rings.
Figure 15:
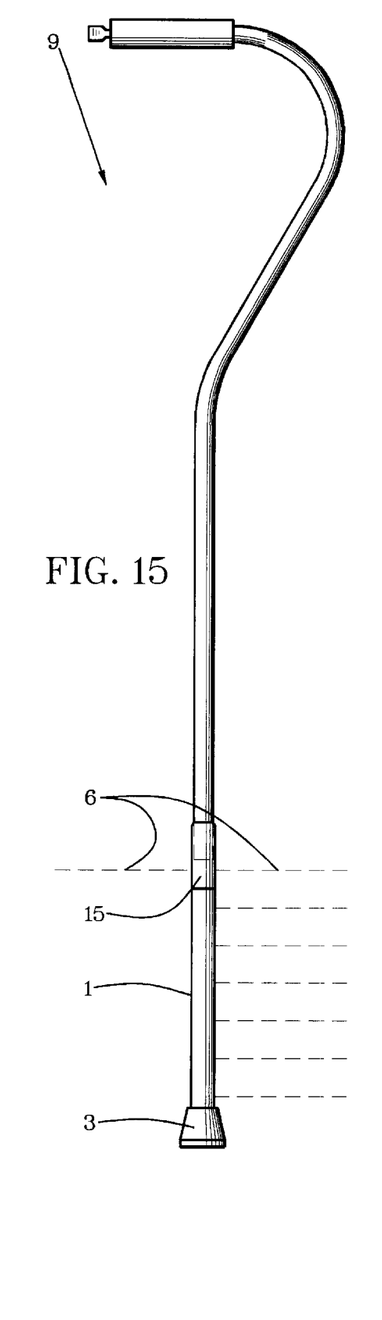
FIG. 15 is an elevation view of a short walking-aid shaft on a cane for containing short vertical reflectors.

Referring to FIGS. 8–14, the vertical reflector 5 has a vertical back surface 14 that is preferably arcuate and positioned proximate an inside surface of the walking-aid shaft 1 and extended selectively intermediate the top reflector 2 and the bottom cap 3. The vertical reflector 5 can be extended to the top reflector 2 and the bottom reflector 8 as shown in FIGS. 8 and 12 and can include a plurality of vertical reflectors 5 having intervals of separation for allowing circumferentially radial emission of light 6 intermediate the intervals of separation as shown in FIGS. 8, 10 and 12. Light rings that include a top light ring 15, a bottom light ring 16 and an intervening light ring 17 can be positioned at the intervals of separation to allow the light 6 to radiate in all directions. Optionally, the light rings can be colored red, yellow or otherwise to attract attention for added safety of a user.

Figures 16, 17, 18:
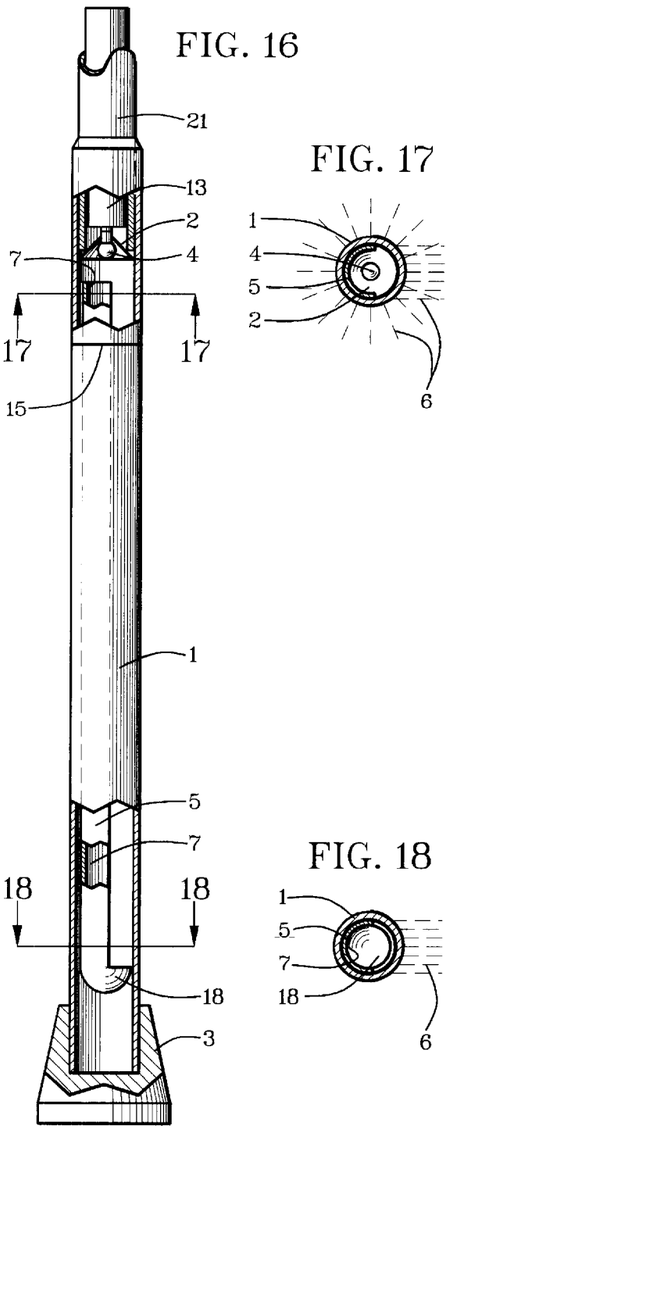
FIG. 16 is a partially cutaway side view of a walking-aid shaft having a vertical reflector with a bottom from which a bottom reflector is extended orthogonally.
FIG. 17 is a section view through section line 16A of FIG. 16 with light rays emitting in all directions at a top light ring and emitting forwardly opposite a top portion of the vertical reflector.
FIG. 18 is a section view through section line 16B of FIG. 16 with light rays a only in a forward direction above the bottom reflector that is on the vertical reflector.

Referring to FIGS. 15–18, the walking-aid shaft 1 can be predeterminedly short for some canes 9, for other walking aids and for short vertical reflectors 5. Top light rings 15 particularly can be colored to provide colored light 6 in all directions at intervals of separation from the top reflector 2 in addition to the light 6 to radiate in all directions. in a forward direction as depicted in FIG. 17.

The bottom reflector can be an extension reflector 18 that is extended from a bottom of the vertical reflector 5.

Figures 19, 20:
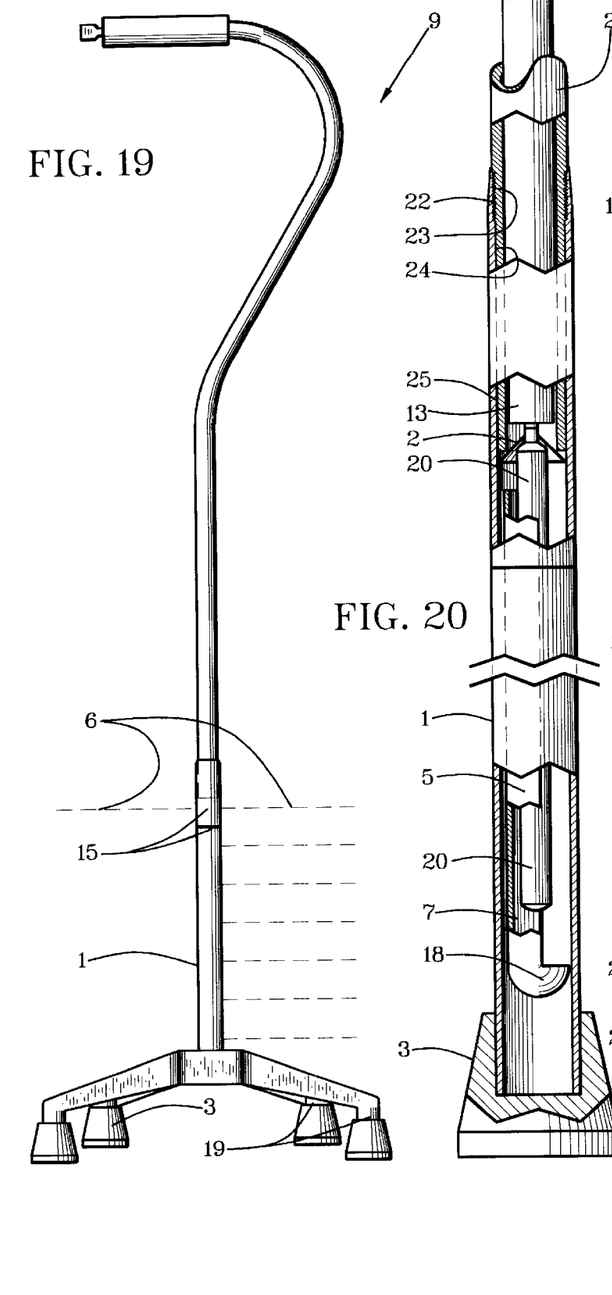
FIG. 19 is an elevation view of a walking-aid shaft on a walker cane.
FIG. 20 is a partially cutaway side view of a walking-aid shaft having a flourescent light, a vertical reflector with a bottom from which a bottom reflector is extended orthogonally; and having threaded attachment to a walking-aid member.

Referring to FIG. 19, the walking aid can be a cane 9 with walker feet 19 on which the bottom caps 3 can be positioned.

Figure 21:
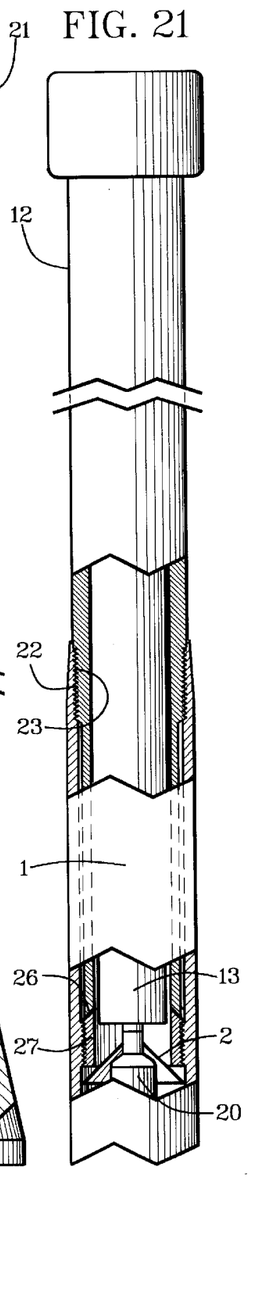
FIG. 21 is a partially cutaway side view of a threaded attachment having a rigidity ring that is fixable selectively to the inside perimeter of the walking-aid shaft.

Referring to FIGS. 20–21, the internal light can be a flourescent light 20 powered by an appropriate power source 13 to provide light throughout much or all of a length of the vertical reflector 5.

For attachment to a walking aid with a walking-aid member 21, the walking-aid shaft 1 can have a top end with internal attachment threads 22 into which external attachment threads 23 of the walking-aid. member 21 are screwed. For rigidity of attachment, the walking-aid member 21 has a rigidity exterior 24 extended a predetermined distance linearly from proximate the external attachment threads 23 for rigidity-fit insertion of the rigidity exterior 24 into a rigidity interior 25 that is downward from the internal attachment threads 22. The rigidity exterior 24 can include an outside circumferential perimeter of a sleeve extension of the walking-aid member 21 and the rigidity interior 25 can include an inside circumferential perimeter of the walking-aid shaft 1.

Optionally as shown in FIG. 21, the rigidity exterior 24 includes a selectively truncate-conical tip 26 of a sleeve extension of the walking-aid member 21 such as the walkway lighter 12 shown; and the rigidity interior 25 includes a matching truncate-conical perimeter of a rigidity ring 27 that is fixable selectively, such as with machine threading shown, to the inside circumferential perimeter of the walking-aid shaft 1.

Figure 22:
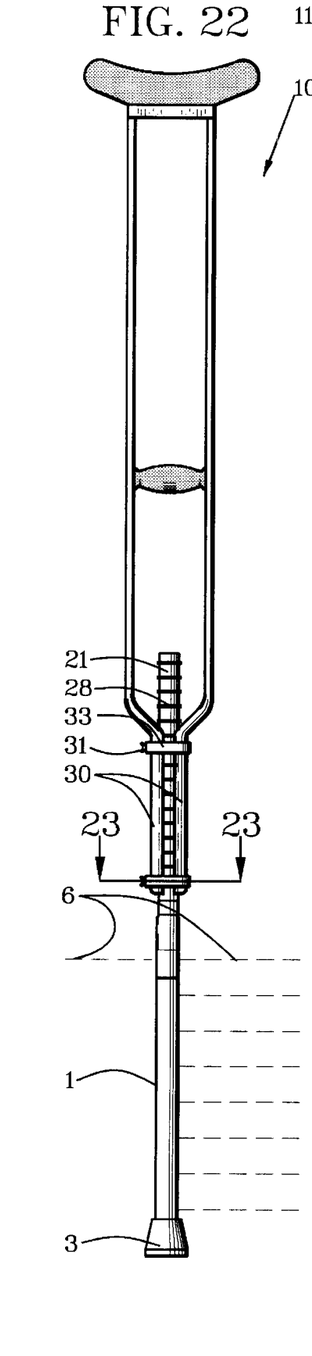
FIG. 22 is an elevation view of a walking-aid shaft on a leg of a crutch.
Figures 23, 24:
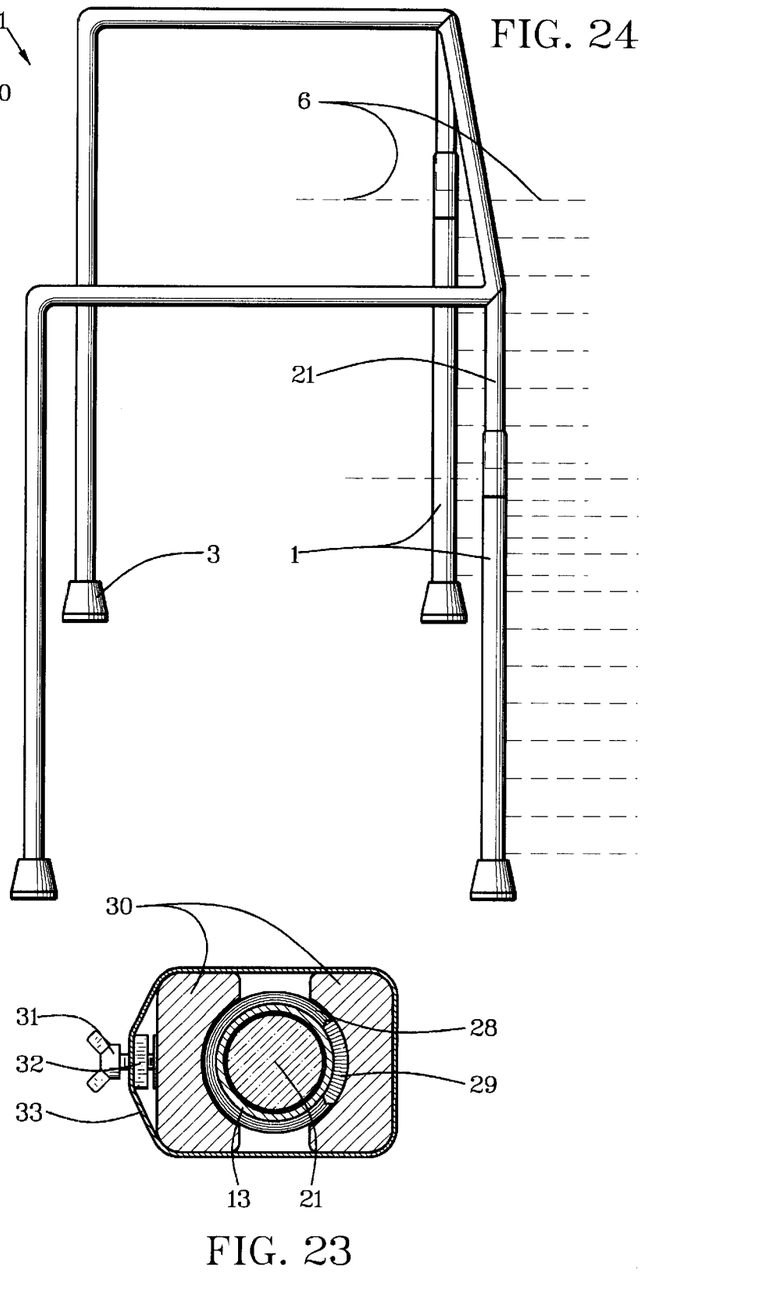
FIG. 23 is a section view through section line 22 of FIG. 22 showing a strap for attachment of the walking-aid shaft to the leg of the crutch.
FIG. 24 is a perspective view of two walking-aid shafts on a walker.

Referring to FIGS. 22–23, the walking-aid member 21 can be attached adjustably to a bottom of the crutch 10 with adjustment rings 28 that fit into ring grooves 29 in oppositely disposed clamp members 30 that are forced together with a pressure bolt 31 in a strap nut 32 in a clamp strap 33. This is an optional clamp that obviates need for conventional adjustment bolts that would conflict with a power source 13 that is shown in the walking-aid member 21 in FIGS. 20–21.

Referring to FIG. 24, walking-aid shaft 1 is preferably affixed directly and rigidly to the walker 11 with the walking-aid member 21.

Figure 25:
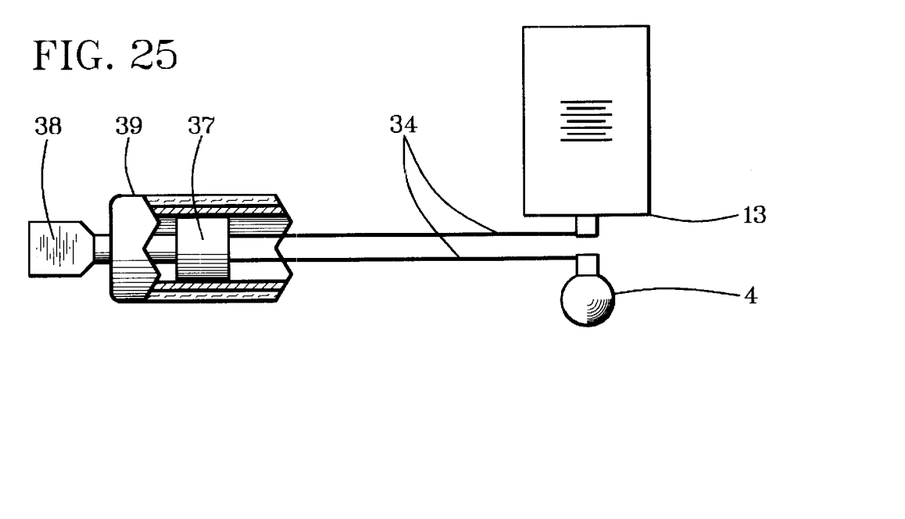
FIG. 25 is a partially cutaway side view of a handle and switch shown with electrical lines in schematic relationship to a power source and an internal light.
Figure 26:
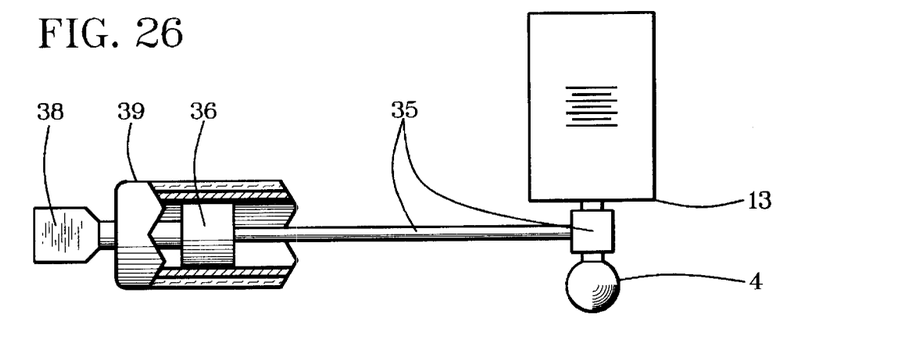
FIG. 26 is a partially cutaway side view of a handle and switch shown with mechanical linkage in schematic relationship to the power source and an internal light.

Referring to FIGS. 25–26, the switchable communication of the electrical power source 13 with the internal light 4 or 20 can include electrical lines 34 shown in FIG. 25 that eliminate unreliableness of mechanical linkage 35 shown in FIG. 26 between the electrical power source 13 and the internal light represented by the incandescent light 4 through a mechanical-linkage switch 36. Optionally, the switchable communication of the electrical power source 13 with the internal light 4 or 20 can include the mechanical linkage 35 shown in FIG. 26 that eliminates current loss of electrical linkage with electrical lines 34 shown in FIG. 25 between the electrical power source 13 and the internal light represented by the incandescent light 4 through an electrical-linkage switch 37. The internal light 4 or 20 can remain on or steady in an "on" mode when receiving continuous power from the electrical power source 13 or be pulsatile, that is, flash on and off intermittently similar to a turn signal on an automobile, when electrical power is provided intermittently.

The mechanical-linkage switch 36 and the electrical-linkage switch 37 may be push buttons, rotary switches with a rotational knob or key 38. A flexible torque rod is depicted as the mechanical linkage 35. For conservation of stored energy, the mechanical linkage 35 is preferred for distances in excess of two-to-three inches of internal light 4 and the power source 13 from a switch 36 or 37 in a handle 39 or other operative position on the walking aid.

A new and useful directionally illuminated walking aid having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A directionally illuminated walking aid comprising:
   a walking-aid shaft that is predeterminedly transparent intermediate a top reflector and a bottom cap;
   an internal light intermediate the top reflector and the bottom cap;
   the walking-aid shaft being a portion of a leg of a walking aid which is a structure selected from the group consisting of a cane, a crutch and a walker with or without wheels;
   an electrical power source in the walking aid in switchable communication with the internal light;
   at least one vertical reflector positioned selectively intermediate the bottom cap and the top reflector inside of the walking-aid shaft for reflecting light outwardly through the walking-aid shaft; and
   the vertical reflector including a reflective channel that is oriented vertically inside of walls of the walking-aid shaft for reflecting the light vertically through the walls of the walking-aid shaft oppositely from the reflective channel.

2. The directionally illuminated walking aid of claim 1 wherein:
   the vertical reflector has a vertical back surface that is positioned proximate an inside surface of the walking-aid shaft and extended selectively intermediate the top reflector and the bottom cap.

3. The directionally illuminated walking aid of claim 2 wherein:
   the reflective channel is arcuate and positioned proximate a back side of the inside surface of the walking-aid shaft.

4. The directionally illuminated walking aid of claim 1 further comprising:
   a bottom reflector vertically below the top reflector for reflecting light back upwardly and towards the reflective channel.

5. The directionally illuminated walking aid of claim 4 wherein:
   the bottom reflector includes an extension reflector that is extended from a bottom of the vertical reflector.

6. The directionally illuminated walking aid of claim 4 wherein:
   the bottom reflector is on the bottom cap.

7. The directionally illuminated walking aid of claim 2 wherein:
   the vertical reflector is extended downwardly from proximate the top reflector.

8. The directionally illuminated walking aid of claim 2 wherein:
   the vertical reflector is extended upwardly from proximate the bottom reflector.

9. The directionally illuminated walking aid of claim 2 and further comprising:
   a top light ring in the walking-aid shaft intermediate the vertical reflector and the top reflector for allowing circumferentially radial emission of light intermediate the top reflector and the vertical reflector.

10. The directionally illuminated walking aid of claim 2 and further comprising:
    a bottom light ring in the walking-aid shaft intermediate the vertical reflector and the bottom reflector for allowing circumferentially radial emission of light intermediate the bottom reflector and the vertical reflector.

11. The directionally illuminated walking aid of claim 2 wherein:
    the at least one vertical reflector includes a plurality of vertical reflectors having intervals of separation vertically for allowing circumferentially radial emission of light intermediate the intervals of vertical separation.

12. The directionally illuminated walking aid of claim 1 wherein:
    at least one predetermined portion of the walking-aid shaft has predetermined coloring for emission of a colored light.

13. The directionally illuminated walking aid of claim 1 wherein:
    the switchable communication of the electrical power source with the internal light includes electrical lines that eliminate unreliableness of mechanical linkage between the electrical power source and the internal light through a mechanical-linkage switch.

14. The directionally illuminated walking aid of claim 1 wherein:

the switchable communication of the electrical power source with the internal light includes a mechanical linkage to eliminate current-loss electrical linkage between the electrical power source and internal light through an electrical-linkage switch.

15. The directionally illuminated walking aid of claim 1 wherein:

the internal light is incandescent.

16. The directionally illuminated walking aid of claim 1 wherein:

the internal light is flourescent.

17. The directionally illuminated walking aid of claim 1 wherein:

the internal light is steady in an on mode.

18. The directionally illuminated walking aid of claim 1 wherein:

the internal light is pulsatile in an on mode.

19. The directionally illuminated walking aid comprising:

a walking-aid shaft that is predeterminedly transparent intermediate a top reflector and a bottom cap;

an internal light intermediate the top reflector and the bottom cap;

the walking-aid shaft being a portion of a leg of the walking aid which is a structure selected from the group consisting of a cane, a crutch and a walker with or without wheels;

an electrical power source in the walking aid in switchable communication with the internal light, at least one vertical reflector positioned selectively intermediate the bottom cap and the top reflector inside of the walking-aid shaft for reflecting light outwardly through the walking-aid shaft;

the vertical reflector including a reflective channel that is oriented vertically inside of the walls of the walking-aid shaft for reflecting the light vertically through the walls of the walking-aid shaft operatively from the reflective channel, wherein the walking-aid shaft has a top end with internal attachment threads into which external attachment threads of a walking-aid member are screwed for attachment of the walking-aid shaft to the walking-aid member to refine the leg of the walking-aid;

the walking-aid member has a rigidity exterior extended a predetermined distance linearly from proximate the external attachment threads for rigidity-fit insertion of the rigidity exterior into a rigidity interior that is downward from the internal attachment threads;

the rigidity exterior including a selectively truncate-conical tip of the sleeve extension of the walking-aid member; and the rigidity interior including a matching truncate-conical perimeter of a rigidity ring that is fixable selectively to the inside circumferential perimeter of the walking-aid shaft.

20. The directionally illuminated walking aid of claim 19 wherein:

the walking-aid member is a leg of a cane.

21. The directionally illuminated walking aid of claim 19 wherein:

the walking-aid member is a leg of a crutch.

22. The directionally illuminated walking aid of claim 19 wherein:

the walking-aid member is a leg of a walker.

23. The directionally illuminated walking aid of claim 19 wherein:

the walking-aid member is a walkway lighter.

* * * * *